Figure 1:
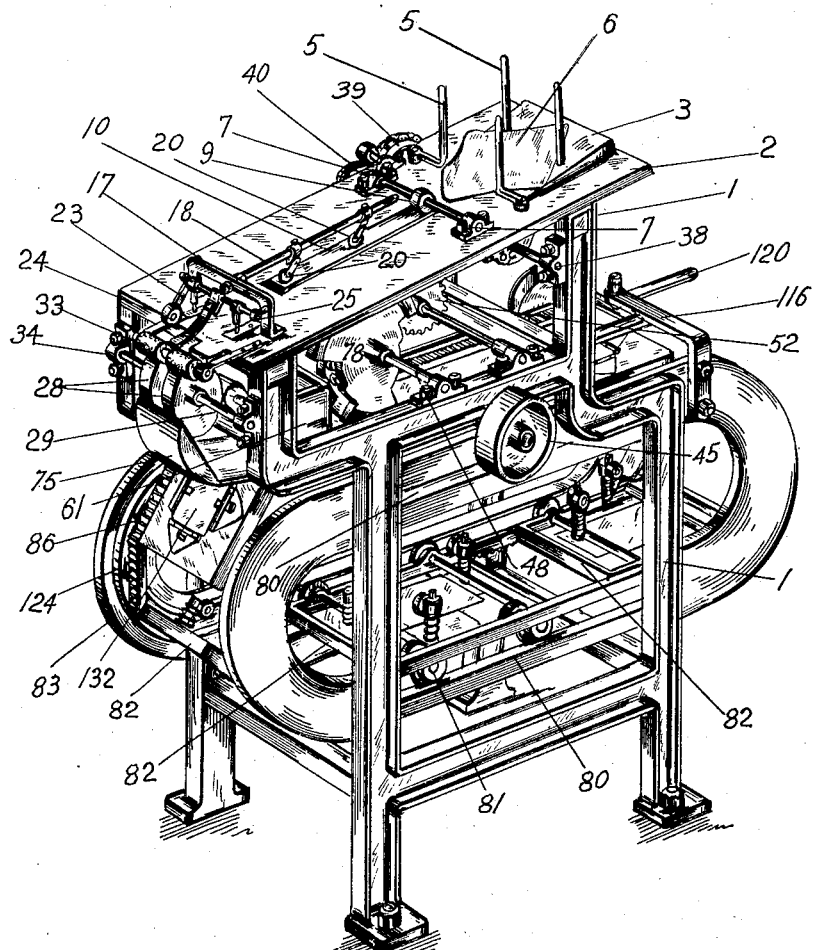

Oct. 8, 1929.    W. W. WARRINGTON    1,730,751
APPARATUS RELATING TO THE MANUFACTURE OF ENVELOPES
Filed Jan. 12, 1928    17 Sheets-Sheet 1

WILLIAM WALTER WARRINGTON
INVENTOR.
By
his Attorney.

Oct. 8, 1929.  W. W. WARRINGTON  1,730,751
APPARATUS RELATING TO THE MANUFACTURE OF ENVELOPES
Filed Jan. 12, 1928   17 Sheets-Sheet 4
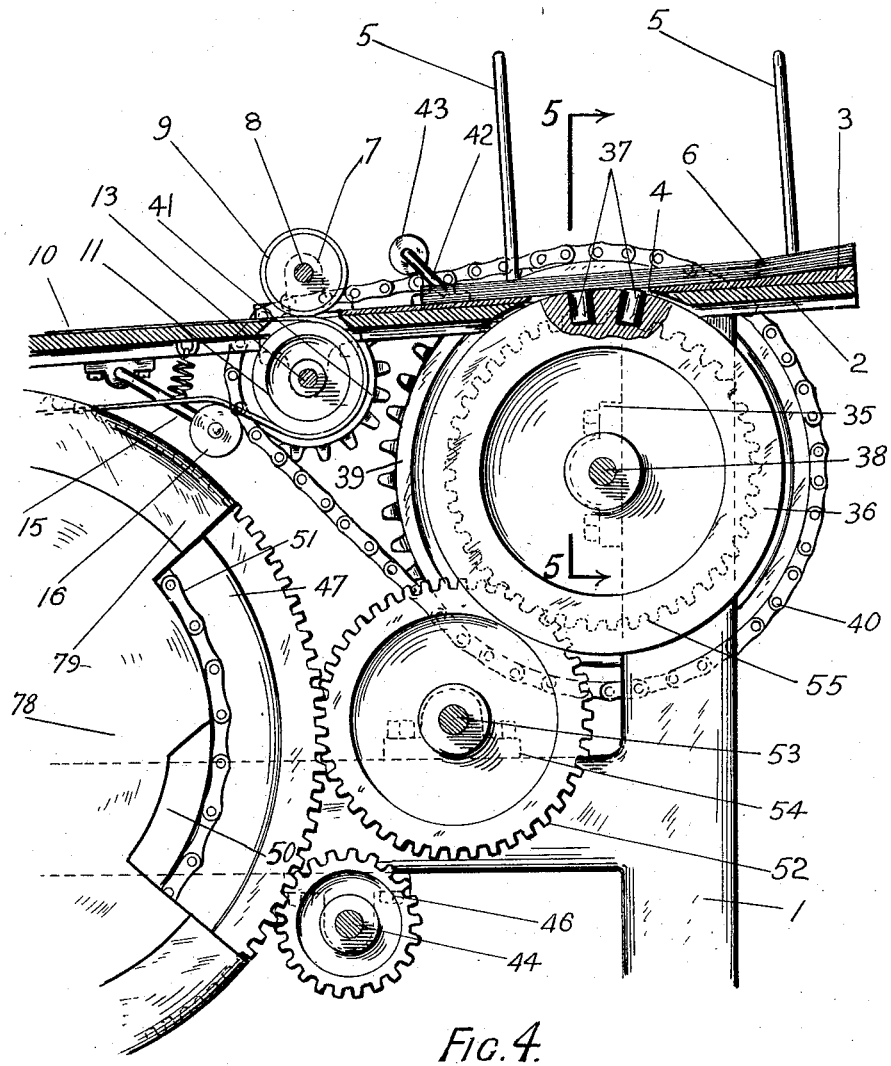
Fig. 4.
WILLIAM WALTER WARRINGTON
INVENTOR
By 
his Attorney Oct. 8, 1929.  W. W. WARRINGTON  1,730,751
APPARATUS RELATING TO THE MANUFACTURE OF ENVELOPES
Filed Jan. 12, 1928  17 Sheets-Sheet 5

WILLIAM WALTER WARRINGTON
INVENTOR

By ⟨signature⟩
his Attorney.

Oct. 8, 1929.  W. W. WARRINGTON  1,730,751
APPARATUS RELATING TO THE MANUFACTURE OF ENVELOPES
Filed Jan. 12, 1928   17 Sheets-Sheet 6

WILLIAM WALTER WARRINGTON
INVENTOR
By
his Attorney.

Oct. 8, 1929. W. W. WARRINGTON 1,730,751
APPARATUS RELATING TO THE MANUFACTURE OF ENVELOPES
Filed Jan. 12, 1928 17 Sheets-Sheet 7
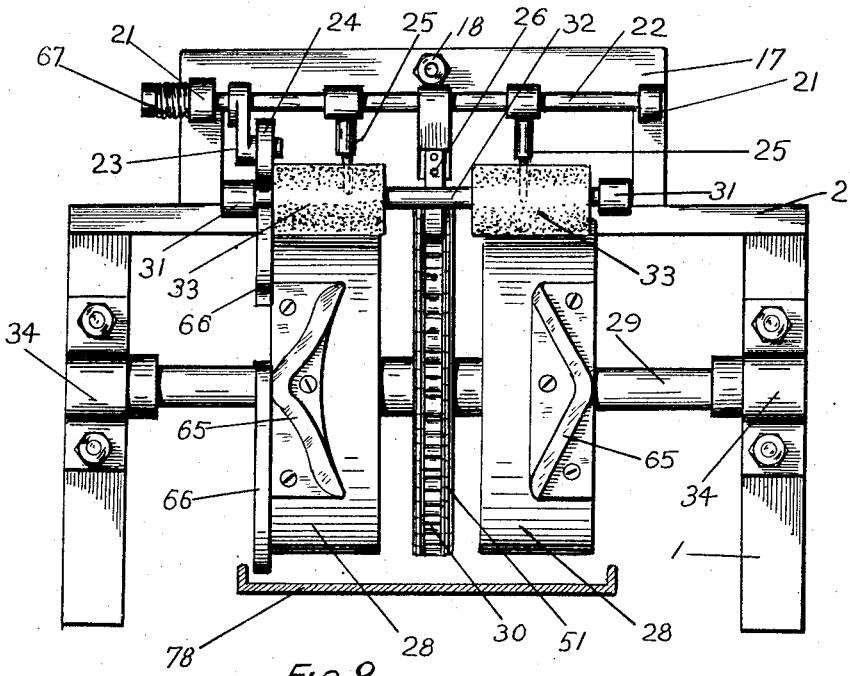
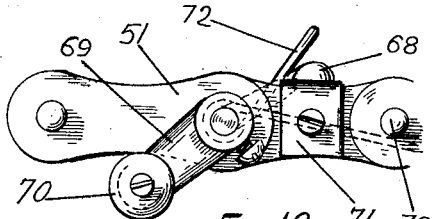
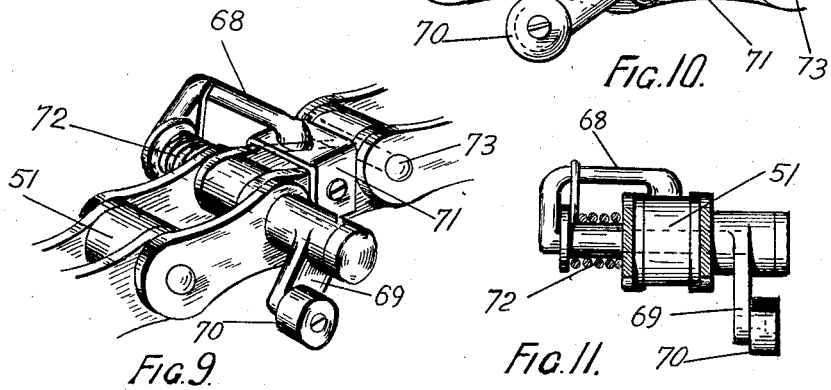
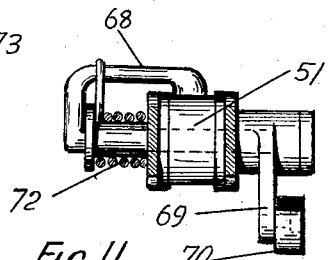
WILLIAM WALTER WARRINGTON
INVENTOR
By
his Attorney.

Oct. 8, 1929.   W. W. WARRINGTON   1,730,751
APPARATUS RELATING TO THE MANUFACTURE OF ENVELOPES
Filed Jan. 12, 1928   17 Sheets-Sheet 8

WILLIAM WALTER WARRINGTON
INVENTOR

By Otto Munk
his Attorney

Oct. 8, 1929.   W. W. WARRINGTON   1,730,751
APPARATUS RELATING TO THE MANUFACTURE OF ENVELOPES
Filed Jan. 12, 1928   17 Sheets-Sheet 11
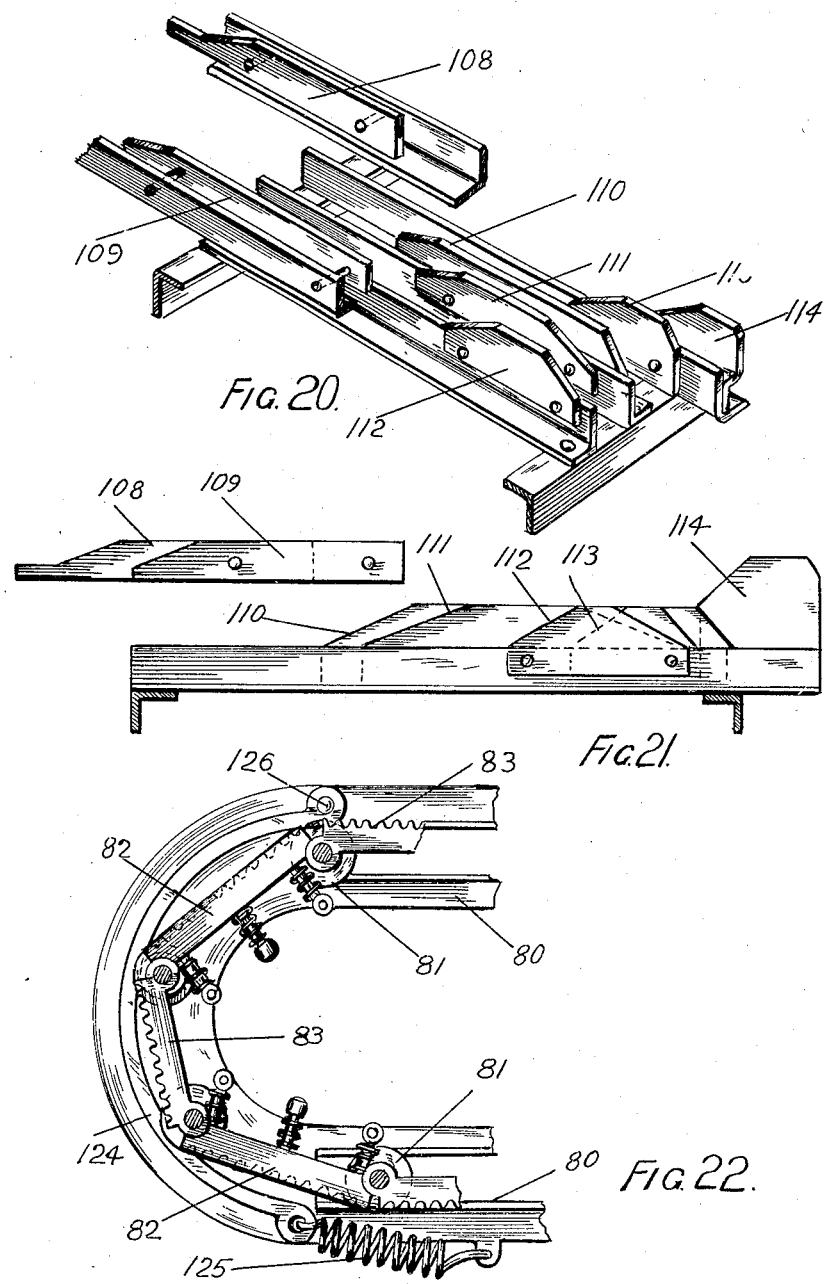
WILLIAM WALTER WARRINGTON
INVENTOR:
By Otto Munk
his Attorney

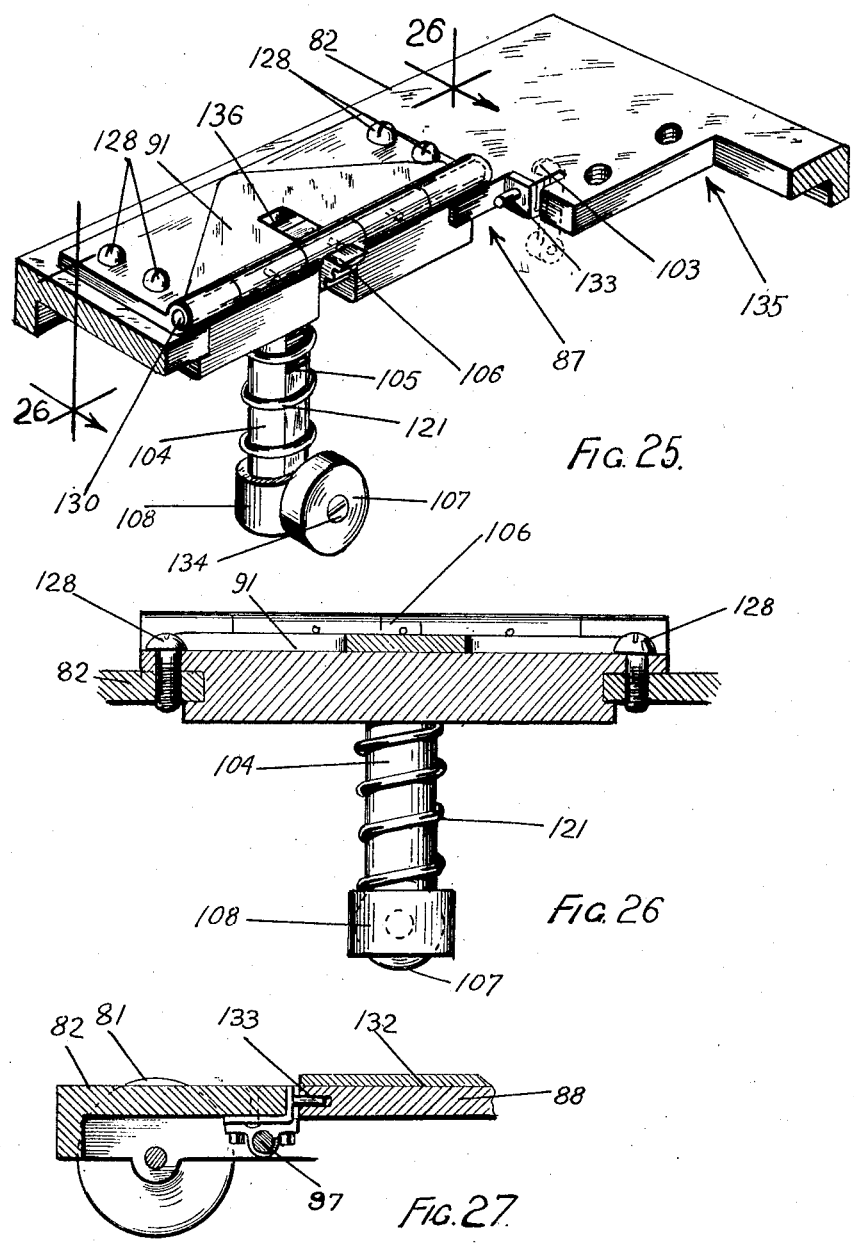

Oct. 8, 1929. W. W. WARRINGTON 1,730,751
APPARATUS RELATING TO THE MANUFACTURE OF ENVELOPES
Filed Jan. 12, 1928   17 Sheets-Sheet 14

WILLIAM WALTER WARRINGTON
INVENTOR

Oct. 8, 1929.　　W. W. WARRINGTON　　1,730,751
APPARATUS RELATING TO THE MANUFACTURE OF ENVELOPES
Filed Jan. 12, 1928　　17 Sheets-Sheet 15

WILLIAM WALTER WARRINGTON
INVENTOR
By (signature)
his Attorney.

Oct. 8, 1929.        W. W. WARRINGTON        1,730,751
APPARATUS RELATING TO THE MANUFACTURE OF ENVELOPES
Filed Jan. 12, 1928    17 Sheets-Sheet 16

WILLIAM WALTER WARRINGTON
INVENTOR
By Otto Munk
his Attorney.

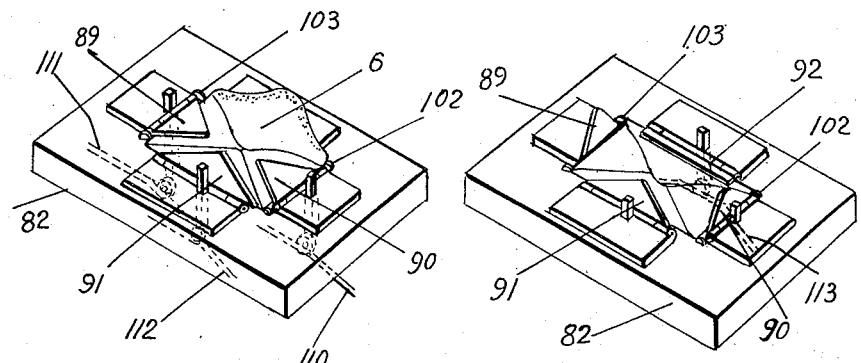
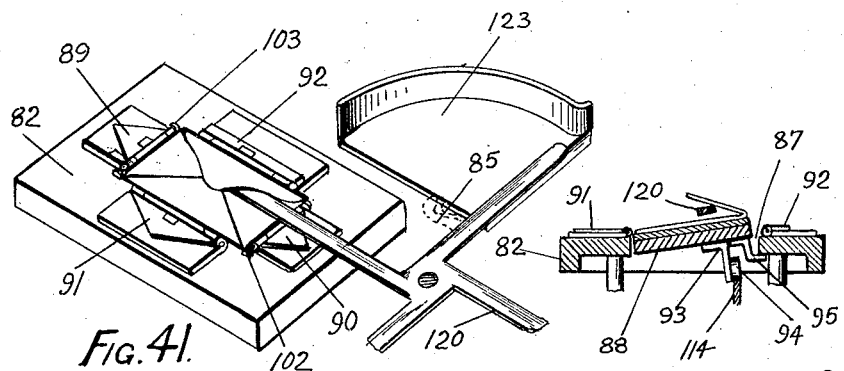
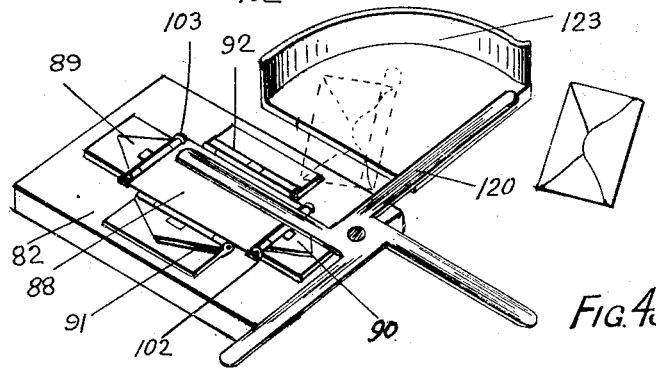

Patented Oct. 8, 1929

1,730,751

UNITED STATES PATENT OFFICE

WILLIAM WALTER WARRINGTON, OF PETERSHAM, NEAR SYDNEY, AUSTRALIA

APPARATUS RELATING TO THE MANUFACTURE OF ENVELOPES

Application filed January 12, 1928, Serial No. 246,227, and in Australia February 7, 1927.

This invention relates to apparatus for manufacturing envelopes from blanks of suitable material which have been previously formed or cut to any desired size or shape.

The principal object of the invention is to provide apparatus which is of simple and cheap construction, less likely to be rendered inoperative whilst in use through broken or disorganized parts, less likely to cause expense in repair, and adapted for the manufacture of envelopes effectively and expeditiously.

Another object of the invention is to provide means whereby pre-cut blanks can be automatically and continuously fed one by one from a pile thereof to means for applying adhesive thereto and whereby the blanks will be subsequently creased and thereafter folded to required shape for the envelopes to be formed.

A further object of the invention is to provide means whereby the envelopes after having been formed will be automatically ejected from the apparatus.

The invention also consists of certain parts and details and combinations of the same which are fully described herein.

Figure 2:
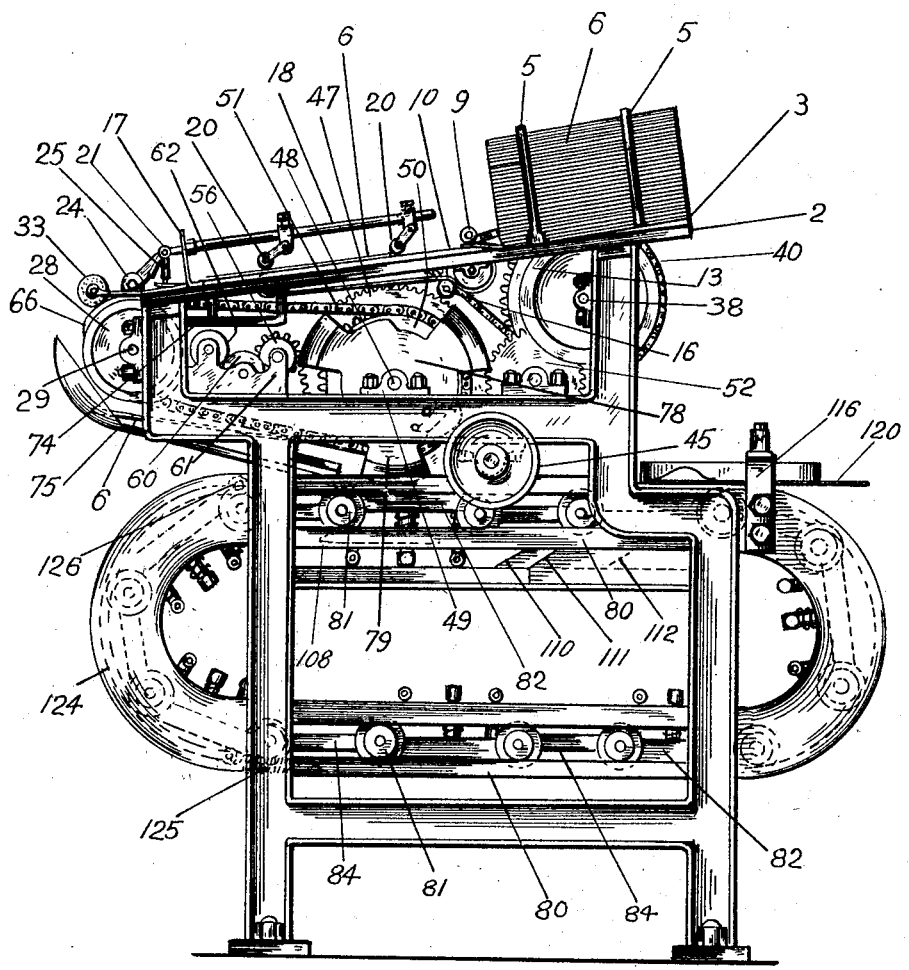
Figure 3:
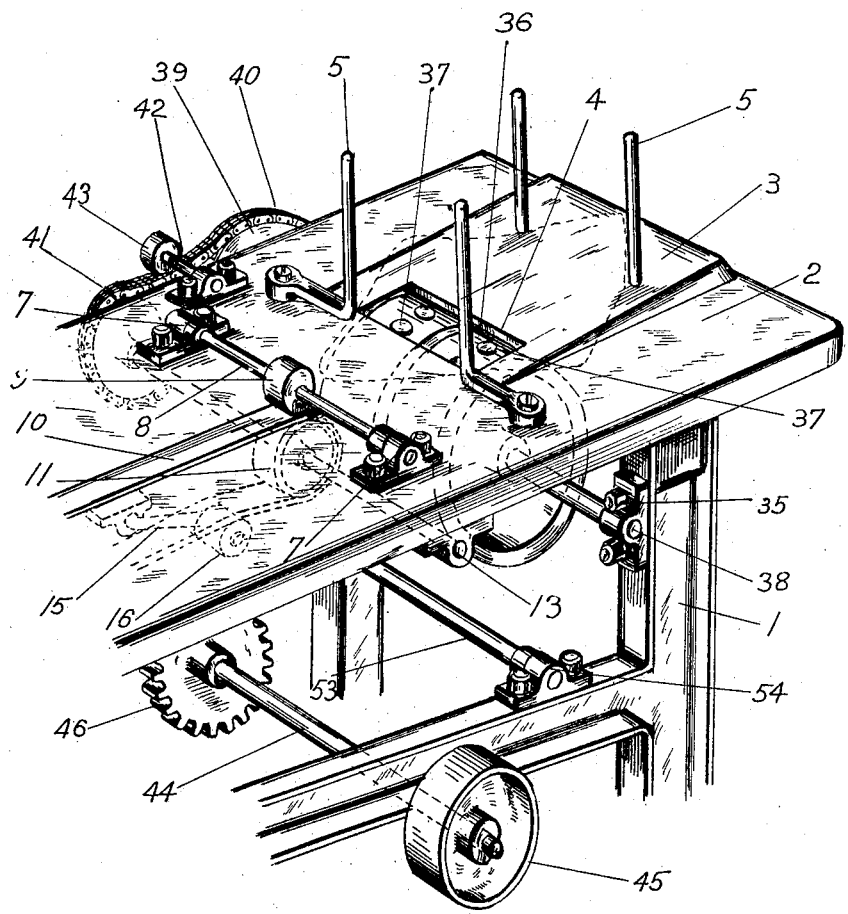
Figure 5:
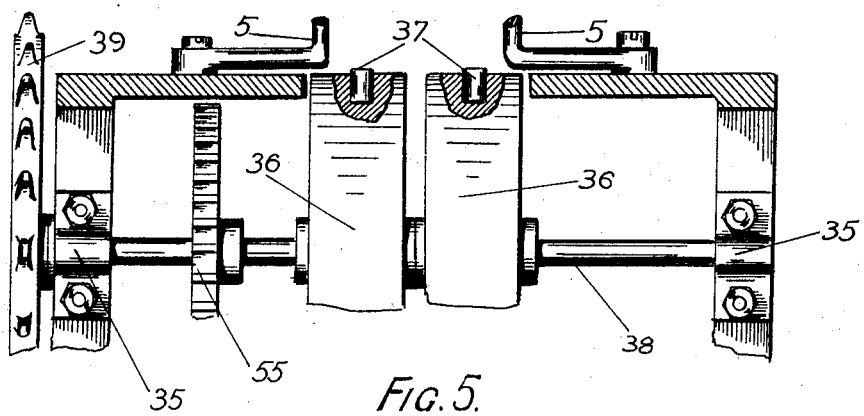
Figure 6:
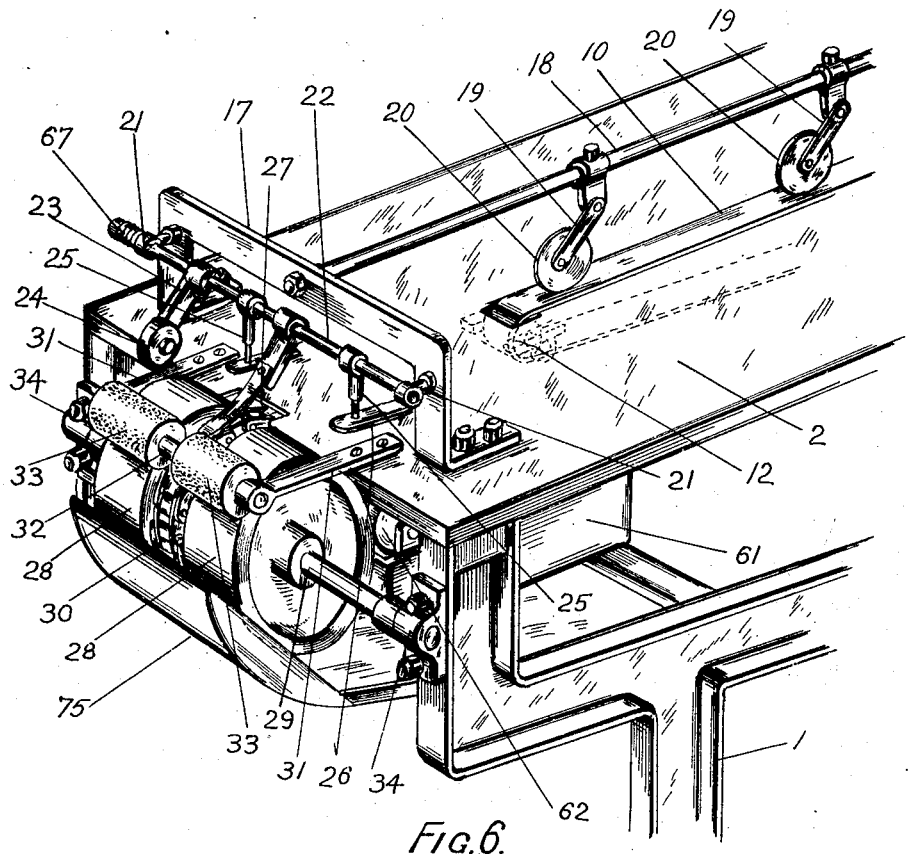
Figure 7:
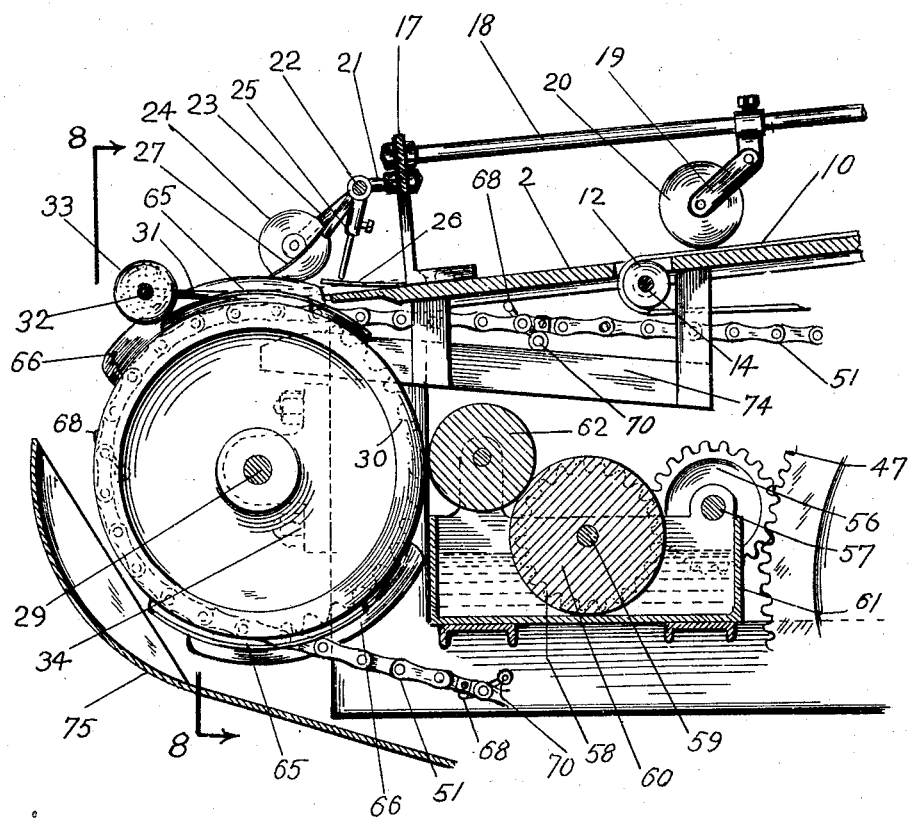
Figure 12:
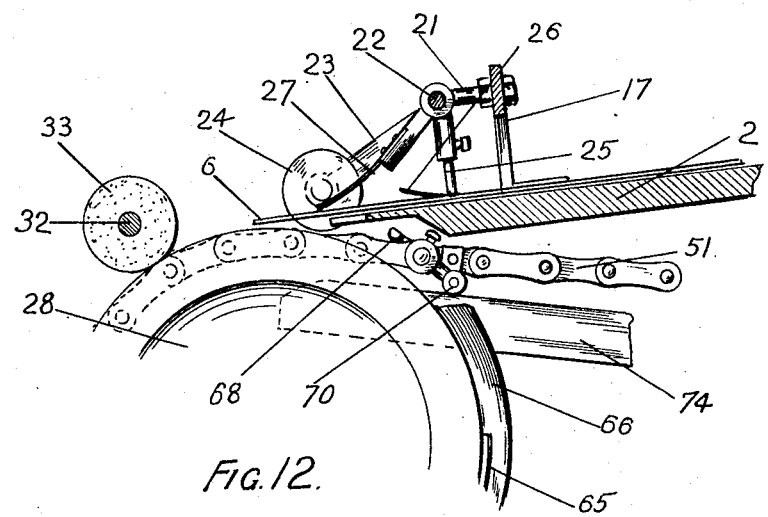
Figure 13:
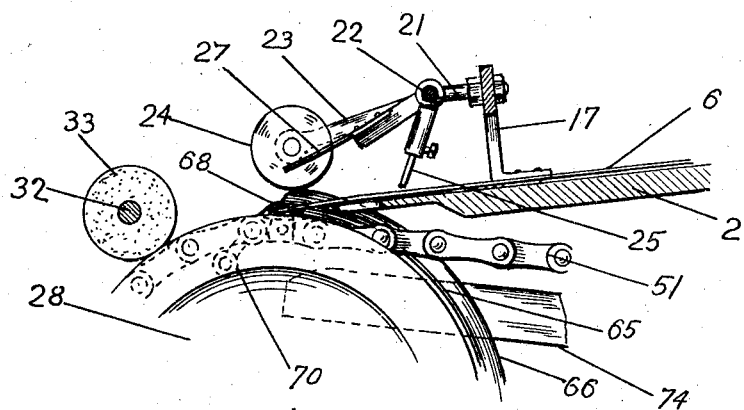
Figure 14:
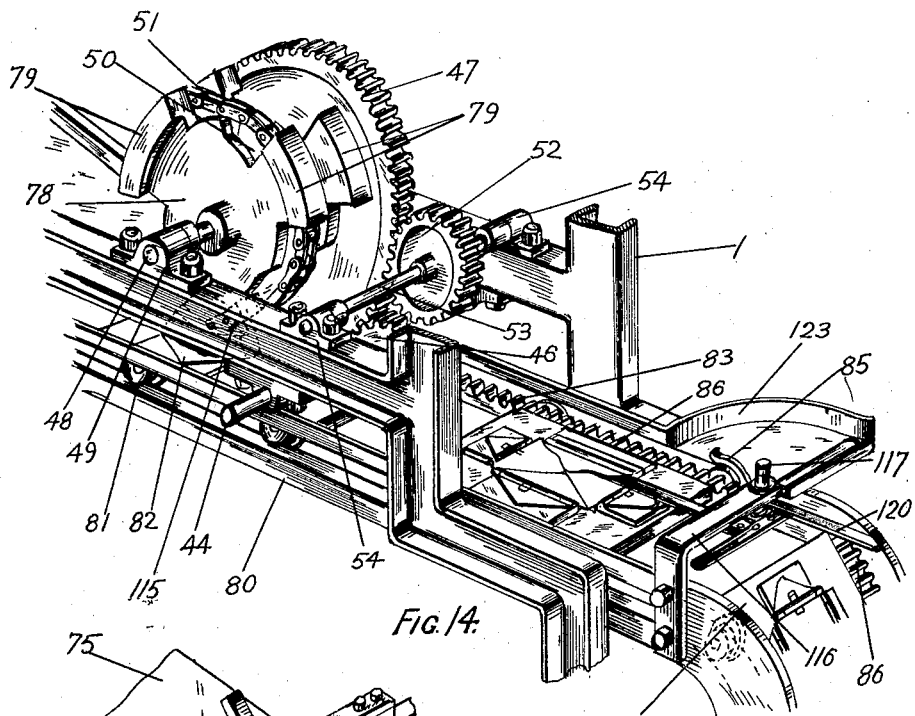
Figure 15:
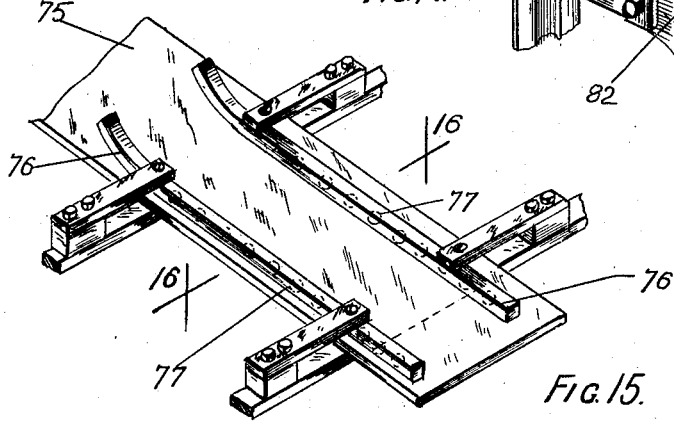
Figure 16:
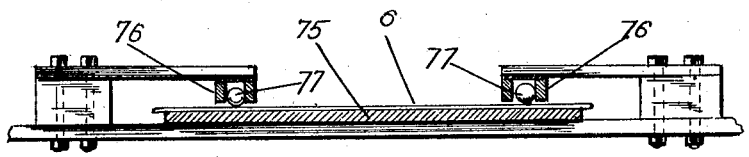
Figure 17:
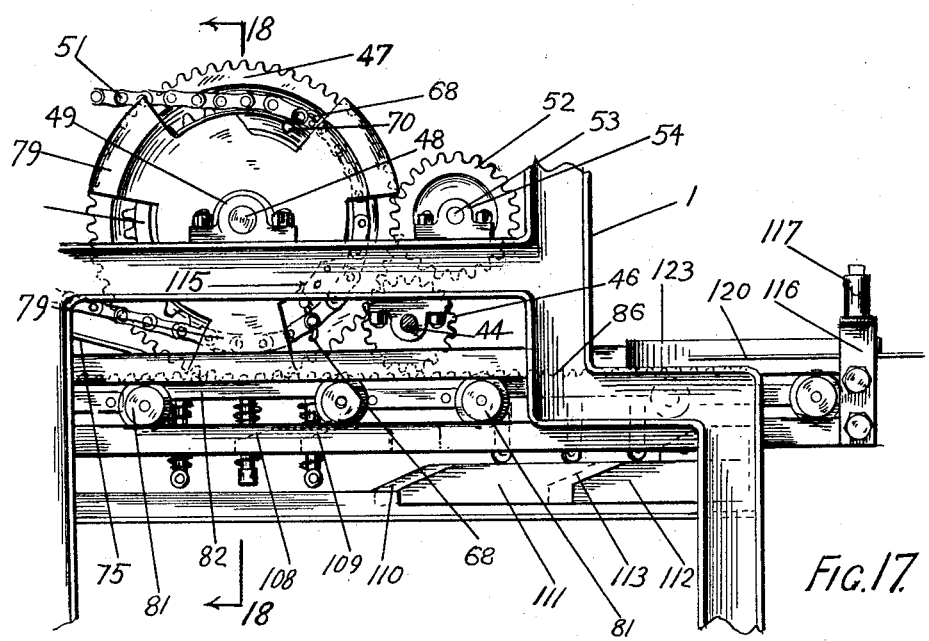
Figure 18:
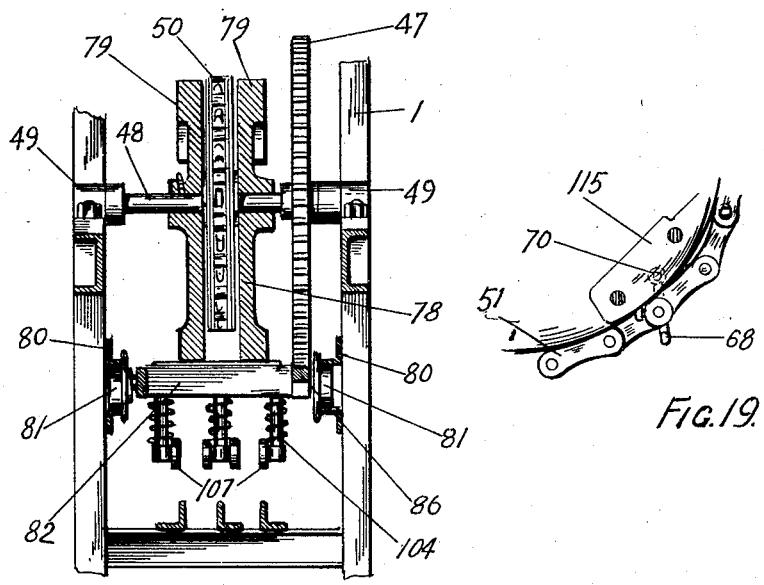
Figure 19:
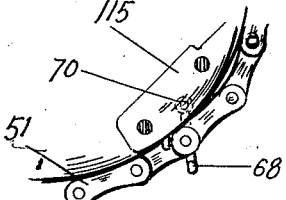
Figure 23:
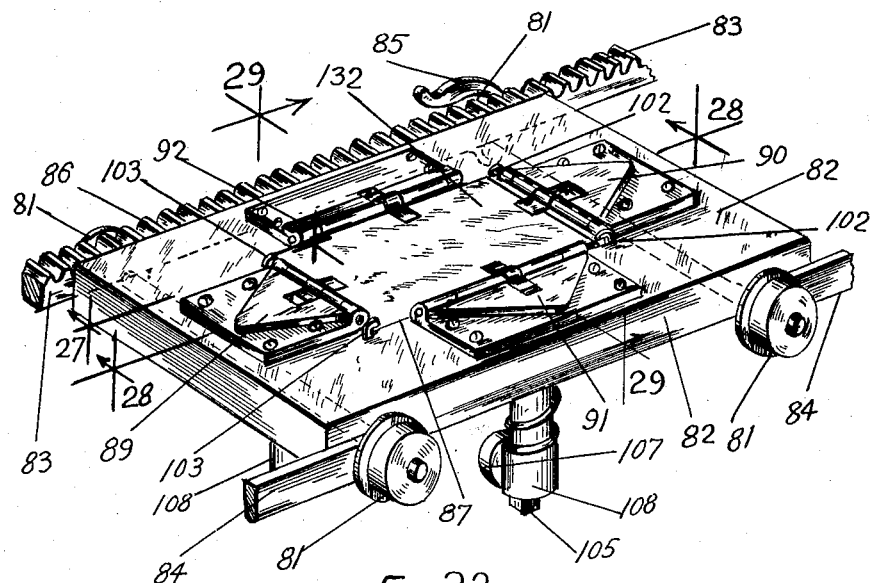
Figure 24:
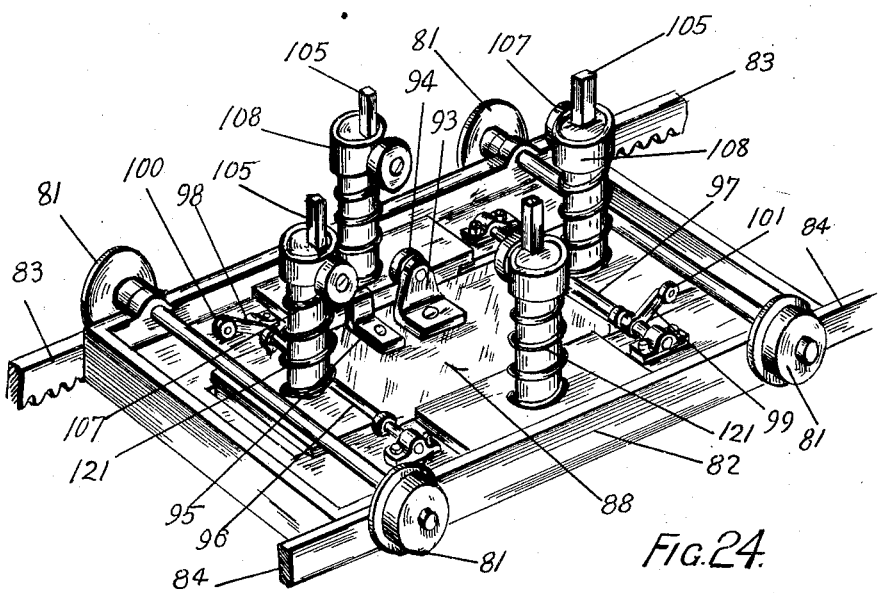
Figure 28:
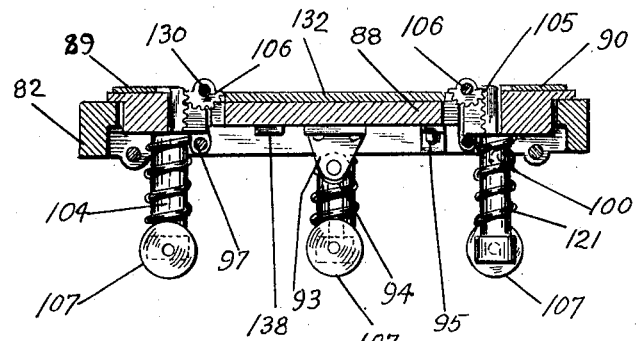
Figure 29:
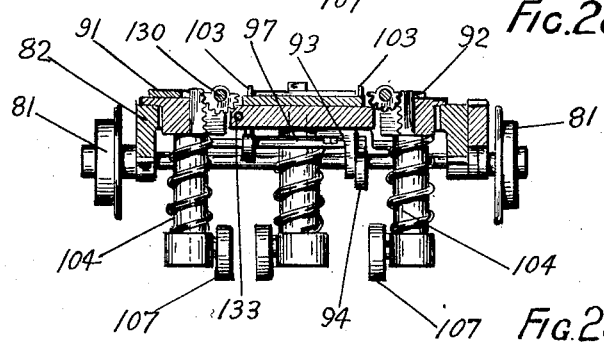
Figure 30:
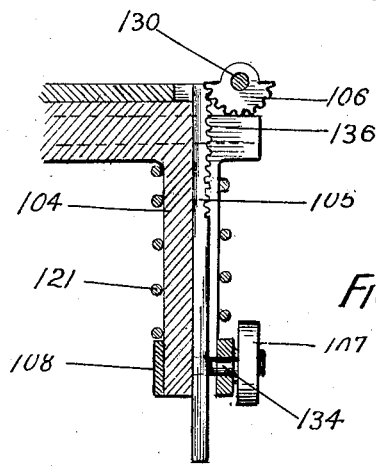
Figure 31:
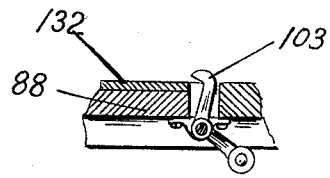
Figure 32:
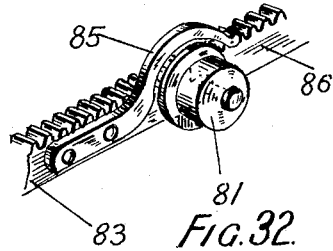
Figure 33:
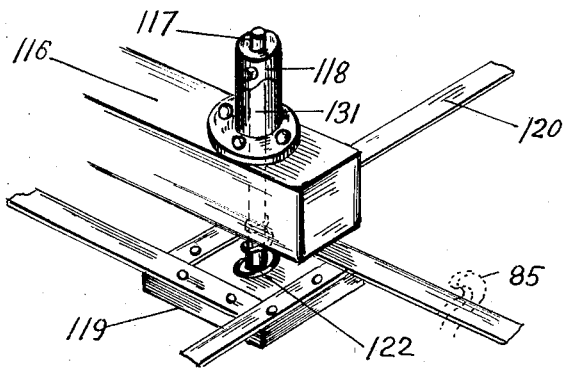
Figure 34:
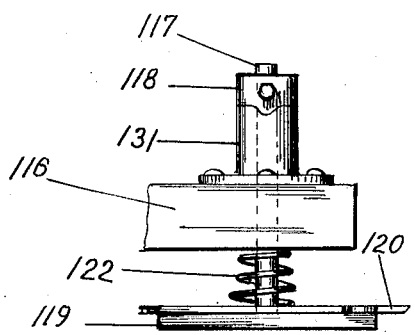
Figure 35:
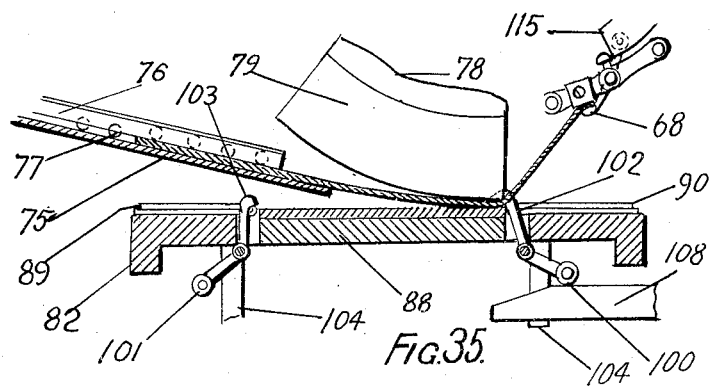
Figure 36:
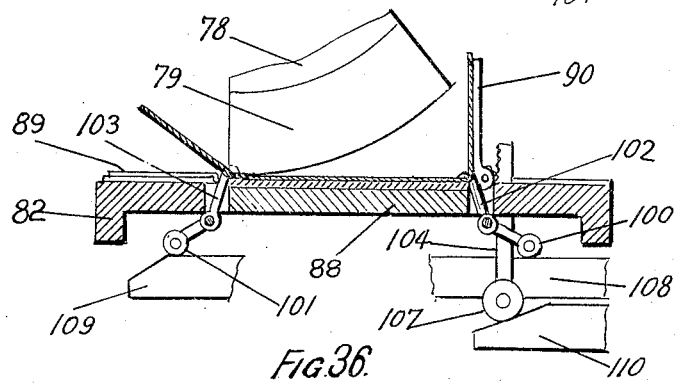
Figure 37:
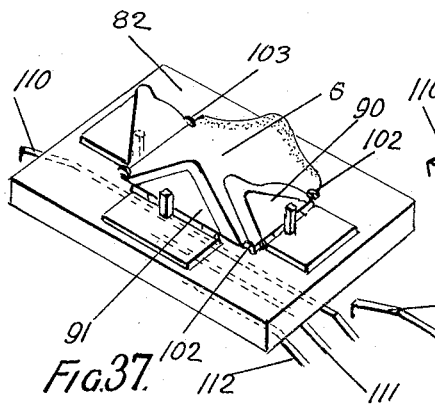
Figure 38:
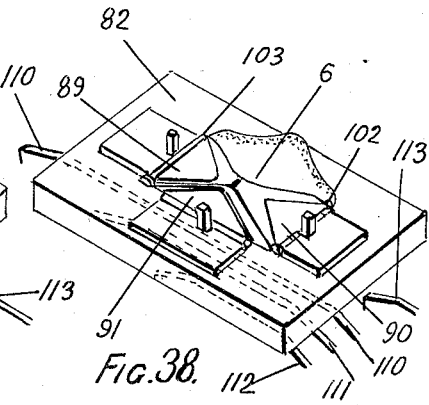

Referring to the accompanying drawings in which the invention is illustrated, Fig. 1 is a perspective view of the apparatus; Fig. 2 a side elevation thereof; Fig. 3 detail perspective view illustrating means for feeding blanks to be folded to envelope form; Fig. 4 longitudinal sectional elevation of means shown in Fig. 3; Fig. 5 cross-sectional elevation on line 5—5, Fig. 4; Fig. 6 detail perspective view of end of apparatus at which blanks are transferred from top of apparatus; Fig. 7 longitudinal sectional elevation of means illustrated in Fig. 6; Fig. 8 sectional elevation on line 8—8, Fig. 7; Fig. 9 enlarged perspective view of gripper means for blank carried by endless chain; Fig. 10 an elevation view thereof; Fig. 11 a sectional detail view of such gripper means; Figs. 12 and 13 sectional views illustrative of action of gripper means in relation to a blank; Fig. 14 enlarged perspective view of creasing and folding mechanism for blanks and means for delivering completed envelopes from the apparatus; Fig. 15 perspective view of chute means for the blanks; Fig. 16 cross-section on plane 16—16, Fig. 15; Fig. 17 side elevation of means shown in Fig. 14; Fig. 18 cross-section on line 18—18, Fig. 17; Fig. 19 detail view showing cam releasing means for gripper means for blank; Fig. 20 perspective view of fixed cam means; Fig. 21 side elevation of such cam means; Fig. 22 detail view of automatic adjuster for endless belt of blank folder means; Figs. 23 and 24 perspective top and bottom views respectively of means for folding blanks to envelope form; Fig. 25 detail sectional perspective view of the said blank folding means; Fig. 26 sectional view on plane 26—26, Fig. 25; Fig. 27 sectional view on plane 27—27, Fig. 23; Figs. 28 and 29 respectively longitudinal and cross-sectional views on planes 28—28 and 29—29, Fig. 23; Fig. 30 sectional detail view of one of the plungers of the blank folder means; Fig. 31 sectional detail view of gripper means associated with the folders; Fig. 32 perspective view of a rack link associated with the folders, the said link having a catch hook; Fig. 33 perspective view of means for ejecting completed envelopes from the apparatus; Fig. 34 elevational view of such ejecting means; Figs. 35 to 43 diagrammatic views illustrating creasing and folding of blanks and means for ejecting completed envelopes from apparatus.

A main framing 1 for the apparatus is provided; such framing carries at the head thereof an inclined table 2 at one end of which is an inclined platform 3, the table 2 and platform 3 having an opening 4 therein. The uprights 5 on the table 2 and platform 3 serve to form a magazine for a plurality of blanks 6 which have been previously cut to required shape to be creased and folded on the apparatus to desired envelope form. On the table 2 are bearings 7 for a shaft 8 which has fixed thereto a roller 9 which cooperates with an endless belt 10 which passes over pulleys 11 and 12 fixed respectively to spindles 13 and 14 journalled in bearings on the table 2, the latter having an opening through which the upper surface of the belt 10 is exposed; the table 2 also carries a bearing for an arm 15 on which a spring controlled jockey roller 16 for the belt 10 is carried.

On the table 2 is fixed a bracket 17 having a rod 18 fixed thereto, such rod having adjustably mounted thereon the connectors 19 carrying rotatable wheels 20 adapted to contact with blanks fed rearward of the apparatus by means of the endless belt 10. Said bracket 17 has bearings 21 for a shaft 22 upon which is fixed the arm 23 carrying roller 24; said shaft has also fixed thereto the lays or stops 25 which cooperate with the springs 26 attached to the table 2. The shaft 22 also has fixed thereto a spring 27' adapted to keep a blank to be folded in contact with the rollers 28 fixed to the rotatable shaft 29 which is journalled in bearings 34 on the framing 1. The shaft 29 has also fixed thereto a sprocket wheel 30. On the table 2 are brackets 31 having bearings for the rotatable spindle 32 to which are fixed the friction rollers 33 serving to guide a blank between them and the rollers 28. The shaft 22 is furnished with a coil spring 67 adapted to return it to normal position after it has been rocked.

Below the table 2 and journalled in bearings 35 on the framing 1 is a rotatable shaft 38 having fixed thereto a pair of rollers 36 having a number of rubber or like friction inserts 37, the said rollers being positioned below the opening 4 in the table 2 and platform 3. Said shaft 38 also has fixed thereto the sprocket wheel 39 to which is connected the chain 40 which is also connected to a sprocket wheel 41 fixed to the spindle 13. On the table 2 is an arm 42 carrying the jockey roller 43 for the chain 40.

Journalled in bearings on the framing 1 is a rotatable shaft 44 to which is fixed a drive pulley 45. The shaft 44 has fixed thereto a spur pinion 46 which meshes with a spur wheel 47 fixed to a rotatable shaft 48 journalled in bearings 49 on the framing 1; said shaft 48 has also fixed thereto a sprocket wheel 50 to which is connected the chain 51, the latter being also connected to the sprocket wheel 30 on the rotatable shaft 29. The spur wheel 47 also meshes with a spur wheel 52 fixed on a rotatable shaft 53 journalled in bearings 54 on the framing 1; such spur wheel 52 meshes with a spur wheel 55 fixed on the rotable shaft 38 to which the rollers 36 are fixed.

The spur wheel 47 also meshes with a spur pinion 56 on the shaft 57 supported in bearings on the trough 61; the spur pinion 56 meshes with a spur pinion 58 on a rotatable shaft 59 journalled in bearings on the trough 61 and having fixed thereto rollers 60 which rotate in liquid adhesive carried in the trough 61 supported on the framing 1. Said rollers 60 contact with the rotatable transfer rollers 62 mounted on the shaft 63 supported in bearings on the trough 61.

Both rollers 28 have each attached to their circumference a pair of print plates 65 shaped to receive liquid adhesive from the rollers 62 and to transfer same to parts of an envelope blank passing over the said rollers 28. One of said rollers 28 may also have affixed thereto two cams 66; these cams are positioned diametrically opposite to one another on one side of the carrying roller 28. The sprocket chain 51 has pivoted thereon but in spaced relation to each other gripper arms 68 having an extension 69 which carries a roller 70; said gripper arms 68 cooperate with a plate 71 on the sprocket chain 51 and on their shank is a coil spring 72, one end of which bears on the arm 68 and the other end of which bears against a projecting pin 73 on the chain 51. Said springs serves to normally allow the arm 68 to be pressed on the plate 71 while also allowing such arm to be raised from such plate when the extension 69 is tripped through the roller 70 contacting with a cam or abutment plate 74 fixed on the framing 1.

Attached to the framing 1 is a chute 75; such chute has associated therewith guide frames 76 which carry a series of balls 77, the latter serving as tensioning guides for a blank fed along the chute 75.

There is fixed to the shaft 48 a pair of elements 78 having sector shaped blank creasing extensions 79 and on the framing 1 is carried tracks 80 for wheels 81 of a series of tables 82 which are linked to each other and are adapted to carry means for folding blanks to envelope form. Two series of jointing links are provided for the tables 82, one of such series of links being furnished with rack teeth 83 whilst the other series 84 thereof are plain; the rack teeth 83 have attached thereto a catch finger 85 and the tables 82 have attached thereto the racks 86. The rack teeth 83 and the racks 86 mesh with the spur wheel 47 on the shaft 48. In the tables 82 is an opening 87 in which opening is hinged a platform 88, having on its upper surface a rubber covering 132; said platform 88 is hinged on the pins 133 on the table 82 and it is capable of resting upon the lug 138 on the lower surface of such table. Attached to the platform 88 is the bracket 93 with roller 94 also stop bracket 95. The spindles 96 and 97 journalled in bearings on the bottom of the tables 82 have fixed thereto arms 98 and 99 with rollers 100 and 101. Such spindles 96 and 97 also respectively carry catch fingers 102 and 103. Each of the tracks 80 may carry at their arcuate ends an adjuster device consisting of curved plates 124 pivoted at 126 at one end thereof to the tracks 80 and at the other end connected to one end of an extensible coil spring 125 whose other end is connected to the tracks 80.

Adjustably associated with the tables 82 are the base plates 127 each of which has preferably formed integral therewith a slotted extension 104 in which slides a rack rod 105, the said rod having fixed thereto a spindle 134 on which is mounted a rotatable roller 107. On each of the extensions 104 is a collar 108, and a coil spring 121 surrounds the respective extensions 104 and abuts the respective collars 108 at one end and the respective base plates 127 at the other end. Said base plates are adapted to be adjustably positioned in openings 135 in the tables 82 and to be secured thereto by screws 128 or other suitable means; such plates 127 have pintle pins 130 for blank folding flaps 89, 90, 91 and 92; the flaps 89 and 90 are respectively located at the opposite ends of the tables 82 and the respective flaps 91 and 92 are located on opposite sides of the tables 82. There is an opening 136 in each of the base plates 127 and in the flaps 89, 90, 91 and 92 to permit the rack rods 105 when operated to project therethrough. Each of the blank folding flaps 89, 90, 91 and 92 is provided with a mutilated spur pinion 106, and said flaps and the pinions 106 are fixed on the pintle pins 130.

To the framing 1 is affixed a series of cams 108, 109, 110, 111, 112, 113 and 114. Also attached to the framing 1 is the cam 115, and to one of the tracks 80 is fixed the bracket 116. Said bracket 116 has an opening therein for a rotatable spindle 117 which has fixed thereto a toothed collar 118 cooperating with a toothed sleeve 131 secured to the bracket 114. The spindle 117 is attached to a plate 119 having a series of projecting arms 120 adapted to eject envelopes from the apparatus one by one after they have been completed on the apparatus. Surrounding the spindle 117 is a coil spring 122 whose opposite ends abut respectively the plate 119 and the bracket 116. Such coil spring 122 serves to prevent the plate 119 with arms 120 spinning after each movement thereof through contact with the arms 120 separately by the catch 85 on the rack links 83. The fender 123 is fixed to the framing 1 below the projecting arms 120.

In operation, assuming that power is communicated to the pulley 45 whereby same is rotated and the gearing associated with the shaft of such pulley is also operated whereby the rollers 36 are rotated, blanks 6 will be fed forwardly one by one by the inserts 37 from the pile of blanks in the magazine thereof onto the driven belt 10 and under the pressure roller 9. Each blank 6 is thus carried over the top of the table 2 and passes under the blank carrying rollers 20 until its forward edge abuts the lays or stops 25; it is held there until one of the cams 66 contacts with and raises the roller 24 and releases the lays or stops 25 from engagement with the springs 26; the spring 27 keeps the forward edge of the blank 6 depressed to be engaged by the gripper 68 when the latter is released from the cam 74. When engaged by the gripper 68 the blank 6 is temporarily secured to the endless chain 51. The blank 6 is now passed around the rollers 28 and pressed by the rollers 33 against the prints 65 on such rollers, the prints 65 having previously been coated with adhesive from the transfer rollers 62.

On leaving the rollers 28 the blank 6 is now drawn by the chain 51 into and along the chute 75 with its adhesive edges facing upwardly and it then passes beneath the tensioning balls 77 in the guide device 76 (see Fig. 32) and it then passes onto the top of one of the folders 82 and beneath the rotatable creasing elements 79. When one portion of the creasing elements 79 has engaged with forward portion of the blank 6 simultaneously with the engagement of the blank 6 by the grippers 102 through contact with the cam 108, so also will the gripper 68 contact with the cam 115 and release the creased blank 6 (see Fig. 35) from the chain 51. As the folder 82 on which the blank is situated is travelling forwardly one of the creasing elements 79 will crease an opposite portion of the blank (see Fig. 36) and the grippers 103 will engage with the blank through contact with the cam 109; the blank 6 is thus firmly held upon the associated folder 82. During such action the leading flap 90 of the folder 82 will be operated through contact with the cam 110; when the associated folder 82 is clear of the creasing elements 79 the rear flap 89 of the folder 82 will be raised through contact with the cam 111, and when both said flaps 90 and 89 have completed their folding operation on the portions of the blank 6 the side flap 91 of the folder is operated through contact with the cam 112 (see Fig. 38) when the grippers 102 and 103 will be released from the blank 6. When the flap 91 has completed its folding operation on the blank 6, the other side flap 92 is operated (see Fig. 40) through contact with the cam 113 and the flaps 89, 90, and 91 will return to normal position. Operation of the said flaps 89, 90, 91 and 92 is effected through the respective cams 110, 111, 112, and 113 with which the rollers 107 on the rack rods 105 are adapted to contact, the said flaps having the mutilated gear pinions 106 to cooperate with said rack rods.

As the flap 92 is performing its folding operation on the blank 6 so will one of the blades 120 enter beneath the envelope flap (see Fig. 41) operated upon by the flap 92; as the flap 92 is returning to normal position through the automatic operation of the spring 121 the hinged platform 88 will be raised by the roller 94 contacting with the cam 114. When the platform 88 has been raised (see Fig. 42) the trip finger 85 will contact with and operate the arms 120 to eject the completed envelopes one by one (see Fig. 43) from the apparatus over the fender 123. In every case the flaps 89, 90, 91 and 92 after being operated to perform their folding operations are returned to normal position through the respective coil springs 121 automatically operating after the rollers 107 have ceased to be acted upon by the respective cams 110, 111, 112, and 113.

What I claim as my invention and desire to secure by Letters Patent is:—

1. Envelope making apparatus comprising a framing, means for feeding previously formed blanks one by one to an endless rotative element carrying gripping means, rotatable means for serving adhesive to the blanks after being engaged with said gripping means, means for operating the said gripping means into engagement with and release from said blanks, means for creasing, gripping and folding the blanks to envelope form, and means for tensioning the blanks before being released from the endless element and immediately prior to being creased.

2. Envelope making apparatus according to claim 1, in which the means for feeding the separate blanks to the endless element consist of an endless belt with which cooperate blank carrying rollers and means are provided on the apparatus at the delivery end of the said belt to time the movement of the blanks to permit the gripping means on the endless element engaging with the blanks.

3. Envelope making apparatus according to claim 1, in which feed rollers are located below a pile of previously formed blanks set on the apparatus and the lowermost one of said blanks is fed by such rollers to an endless belt over which the separate blanks are fed to be gripped by the gripping means on the endless element and to be held by such gripping means until released therefrom after the said blanks have been gripped by creasing and gripping means associated with folding means for the blanks.

4. An envelope making apparatus as claimed in claim 1, in which the means for serving adhesive comprises a pair of adhesive supply rollers for the blanks, lays for timing the movement of the blanks with respect to the rollers, springs on the apparatus for controlling the lays, an automatically returnable rock shaft carrying said lays and means for timing the rocking of said shaft to operate the said lays from engagement with the said springs in correspondence with the engagement of the gripping means on the endless element with the blanks, whereby the said blanks are enabled to be passed over said rollers while in engagement with said gripping means.

5. Envelope making apparatus according to claim 1, in which the rotative endless element consists of an endless belt and the gripping means for the blanks thereon consists of a plate with which cooperates a spring controlled rock finger having an extension adapted to abut a projection fixed on the apparatus when the said finger is to be rocked to grip the said blanks and to abut a second projection on the apparatus when the said finger is to be subsequently rocked to release the blanks from the said gripping means.

6. Envelope making apparatus according to claim 1, in which the means for serving adhesive to the blanks consist of a pair of rotatable rollers on a shaft, the latter having associated therewith a pair of cams one of which cams is set diametrically opposite to the other cam and both of said cams are adapted to operate consecutively a rock shaft carrying lays adapted to cooperate with springs on the apparatus, whereby the said rock shaft is operated in timing with the operation of the blank grippers on the endless element to permit of said blanks being engaged by the said grippers before they pass onto the said rollers.

7. Envelope making apparatus according to claim 1, in which the blanks after having been served with adhesive and whilst being engaged by the gripping means on the endless element are transferred to a chute which is provided with means adapted to guide the blanks to creasing means and to tension the blanks in relation to said gripping means.

8. Envelope making apparatus according to claim 1, in which the blanks after having been served with adhesive and whilst being engaged by the gripping means on the endless element are transferred to a chute having guide means for the blanks thereon which guide means comprise a series of balls under which the blanks pass and are adapted to tension the blanks in relation to said gripping means.

9. Envelope making apparatus according to claim 1, in which the creasing means for the blanks consist of a pair of rotatable creasing wheels with spaced segmental faces, adapted to contact with blanks fed thereunder in timing with movement of the blanks on a table travelling below the said segmental faces, whereby the said blanks are creased by said creasing means for end flaps for the envelopes to be made from the blanks.

10. Envelope making apparatus according to claim 1, in which the creasing means for the blanks are adapted to be operated in timing with the feeding of a blank to a travelling table located below the creasing means and the movement of said table with a blank thereon, whereby the said blank will be creased by said creasing means to provide end flaps for the envelope to be made from the blank.

11. Envelope making apparatus according to claim 1, in which the creasing means for the blanks consist of a pair of rotatable creasing wheels with spaced segmental faces and said creasing means are adapted to be operated in timing with the feeding of a blank to a travelling table located below the creasing means and the movement of said table with a blank thereon, the said travelling table having gripper means for the blanks fed thereto and also means for folding end and side flaps for the envelope, and the said creasing means being adapted to contact with and to crease the blank for one of the end flaps of the envelopes simultaneously with the operation and engagement of one part of said gripper means on the travelling table with the blank thereon and the release of the said blank from the gripping means on the endless element, and the said creasing means are also adapted to subsequently crease the blank for the other end flap of the envelope simultaneously with the operation and engagement of the other part of said gripper means on the travelling table with the blank thereon, and the folding means for the separate flaps of the envelope are adapted to be operated consecutively after the creasing of the end flaps for the purpose of folding said flaps.

12. Envelope making apparatus according to claim 1, in which the creasing means for the blanks are adapted to be operated in timing with the feeding of a blank to a travelling table located below the creasing means and the movement of said table with a blank thereon, the said table having gripper means for the blanks associated therewith and also means for folding the end and side flaps of said blanks for the envelope, whereby the said creasing means and said table with gripper and folding means thereof will be operated in timing with each other to permit of the blanks to be creased for the end flaps which are thereafter folded and the consecutive folding of the side flaps subsequently.

13. Envelope making apparatus according to claim 1, in which the folding means for the blanks consists of a travelling table having thereon a series of flap folders, such flap folders comprising a pair of flaps each pair of which is hinged to means located on the ends and sides of the table respectively and adapted to be operated in such manner that as the table is travelling forwardly with a blank thereon the forward flap of the blank will be folded and thereafter the rearward flap of the blank will be folded and subsequently the side flaps will be consecutively folded.

14. Envelope making apparatus according to claim 1, in which the folding means for the blanks consists of a travelling table having a series of flap folders located respectively on the ends and sides thereof said folders comprising a base plate adjustably attachable in openings in the table and carrying a slotted extension in which a rack rod is slidable and cooperable with a gear wheel on a pintle for the pivoted leaf of the folder, and means on the extension whereby the rack rod is positively slidable in the said extension to raise the leaf to fold a flap of the envelope and to automatically return the said rod to normal position whereby the said flap is returned to normal position to lie on the said plate.

15. Envelope making apparatus according to claim 1, in which the folding means for the blanks consists of a travelling table having adjustably and hingeably supported thereon a series of flap folders, such flap folders comprising a pair of flaps each pair of which is hinged to means located on the ends and sides of the table respectively, and the centre of the table has hinged thereto a platform whose upper surface carries a resilient cover, the said flap folders being adapted during the forward movement of the said table to be operated consecutively to fold the forward and rear flaps one after another and to also similarly fold the two side flaps, and the said platform being adapted to be raised from the upper face of the table subsequent to the folding of the said four flaps of the envelope whereby the completed envelope will be dischargeable therefrom.

16. Envelope making apparatus according to claim 1, in which the folders for the flaps of the envelope comprises a travelling table to which is pivotally attached grippers for a previously formed blank which is fed thereto, the said table also having hingeably connected to means thereon a series of flap folders arranged respectively one on each end of the table and one on each side thereof, and also a platform hingeably attached to the centre thereof, and means are associated with the grippers and also with the flap folders and platform, whereby on such latter means contacting with separate cams fixed on the framing of the apparatus the said grippers are operated to grip the said blank, the said folders are consecutively operated to fold the separate flaps of the envelope, and the said platform is raised to permit of the completed envelope being discharged from the apparatus.

17. Envelope making apparatus according to claim 1, in which the folding means for the flaps of the envelope comprises a series of travelling tables which are linked to each other to form an endless series thereof, and the framing of the apparatus carries a track over which wheels on the travelling tables are adapted to run, folding means are provided on each of the said tables adapted to be operated to permit consecutive folding of the separate flaps of the envelope, and a platform is hinged to the centre of each of the said tables adapted to be raised when a completed envelope is to be discharged therefrom.

18. Envelope making apparatus according to claim 1, in which the folding means for the flaps of the envelope comprise a series of travelling tables with means thereon capable of being operated to fold separate flaps of the envelope in consecutive order and also carrying a hinged platform capable of being raised when a completed envelope is to be discharged therefrom, a series of rack links connect the series of tables to each other at one side thereof, such rack links being a continuation of racks fixed to one side of each of the tables, a series of links connect the series of tables at the other side thereof, and means cooperate with the said fixed racks and rack links, whereby the said series of travelling tables are operated.

19. Envelope making apparatus according to claim 1, in which the folding means for the flaps of the envelope comprise a series of travelling tables with means thereon capable of being operated to fold separate flaps of the envelope in consecutive order and also carrying a hinged platform capable of being raised when a completed envelope is to be discharged therefrom, a series of rack links connect the series of tables to each other and are aligned with racks fixed to each said table at one side thereof, a series of links connect the series of tables at the other side thereof, catch hooks are located on one of the rack links of each said tables adapted to cooperate with rotatable means associated with the framing of the apparatus and capable of engaging with a completed envelope on said hinged platform to eject such envelope therefrom, and means cooperate with said racks and rack links, whereby the said travelling tables are operated on tracks on the said framing.

20. Envelope making apparatus according to claim 1, in which the folding means for the flaps of the envelope comprise a series of travelling tables with means thereon capable of being operated to fold separate flaps of the envelope in consecutive order, links connect the separate tables to each other at each side thereof, an endless track is provided on the apparatus on which wheels on the said tables are capable of running, and adjuster means for the running of said tables on said track are associated with the curved ends of said track, the said adjuster means consisting of a curved plate hinged at one end to said track and at the other end connected to one end of an extensible coil spring whose other end is connected to the said track.

21. An envelope making apparatus as claimed in claim 1, including ejecting means cooperating with the folding means to eject the completed envelopes from the apparatus, comprising a bracket attached to the framing of the apparatus and carrying a spindle rotatable therein, the said spindle passing through a block also attached to said framing and having mounted thereon a toothed sleeve through which passes the said spindle, a collar on said spindle having teeth cooperating with teeth on said sleeve, a platform fixed on said spindle to be rotatable therewith and carrying projecting arms disposed to pass over the folding means and engage under the loose flap of an envelope and against the fold thereof to carry the envelope out of the folding means, a coil spring associated with said spindle and adapted to prevent spinning of said platform and arms after rotation thereof by means associated with the envelope blank folding means, and a fender for completed envelopes over which the said arms move.

22. Envelope making apparatus according to claim 1, in which the means for feeding blanks to be treated on the apparatus, the means for supplying adhesive to the said blanks, the means for creasing said blanks, and a series of travelling tables carrying folding means for said blanks are all rotatably driven through interconnecting gear devices which receive drive power through a main driving shaft associated with the framing of the apparatus.

In testimony whereof I affix my signature.
WILLIAM WALTER WARRINGTON.